United States Patent
Pang et al.

(10) Patent No.: US 10,643,048 B2
(45) Date of Patent: May 5, 2020

(54) FINGERPRINT SENSOR AND CORRECTION METHOD THEREOF

(71) Applicant: SHENZHEN GOODIX TECHNOLOGY CO., LTD., Shenzhen, Guangdong (CN)

(72) Inventors: Shu Pang, Shenzhen (CN); Hui Huang, Shenzhen (CN); Xiaochun Cai, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 277 days.

(21) Appl. No.: 15/459,575

(22) Filed: Mar. 15, 2017

(65) Prior Publication Data
US 2017/0185819 A1 Jun. 29, 2017

Related U.S. Application Data

(63) Continuation of application No. PCT/CN2015/094441, filed on Nov. 12, 2015.

(30) Foreign Application Priority Data

Jan. 13, 2015 (CN) .......................... 2015 1 0016150

(51) Int. Cl.
*G06K 9/00* (2006.01)
*G06K 9/52* (2006.01)

(52) U.S. Cl.
CPC ........... *G06K 9/00013* (2013.01); *G06K 9/00* (2013.01); *G06K 9/00087* (2013.01); *G06K 9/52* (2013.01)

(58) Field of Classification Search
None
See application file for complete search history.

(56) References Cited

U.S. PATENT DOCUMENTS

| 7,504,833 B1 * | 3/2009 | Seguine | G06K 9/0002 324/663 |
| 2005/0100200 A1 * | 5/2005 | Abiko | G06K 9/00026 382/124 |

(Continued)

FOREIGN PATENT DOCUMENTS

| CN | 101089574 A | 12/2007 |
| CN | 101231691 A | 7/2008 |

(Continued)

OTHER PUBLICATIONS

International Search Report issued in PCT/CN2015/094441, dated Feb. 16, 2016.

(Continued)

*Primary Examiner* — Fred H Hu
(74) *Attorney, Agent, or Firm* — Heslin Rothenberg Farley & Mesiti P.C.

(57) ABSTRACT

A fingerprint sensor and a correction method thereof are provided. The fingerprint sensor includes a sensing part to be touched by a finger, including sensing units, a processing unit, and a correction unit; the sensing unit is configured to sense, when correction starts, a fingerprint signal and output first data; the processing unit is configured to calculate, according to a mathematical model, a new correction coefficient of the corresponding sensing unit by the first data; and the correction unit is configured to correct, according to the new correction coefficient, second data output by the corresponding sensing unit. The fingerprint sensor can automatically modify a correction coefficient when a physical characteristic of the fingerprint sensor changes, thereby reducing the product return rate and prolonging the product service life, omitting a step of correction before delivery, and reducing the manufacturing difficulty and the manufacturing costs.

10 Claims, 8 Drawing Sheets

(56) References Cited

U.S. PATENT DOCUMENTS

2013/0259321 A1* 10/2013 Aoki .................. G06K 9/00885
            382/115
2014/0133711 A1*  5/2014 Abe ...................... G06K 9/036
            382/115

FOREIGN PATENT DOCUMENTS

| CN | 101231692 A   |   | 7/2008  |
|----|---------------|---|---------|
| CN | 101329727 A   |   | 12/2008 |
| CN | 101809990 A   |   | 8/2010  |
| CN | 102254167 A   |   | 11/2011 |
| CN | 102708360 A   |   | 10/2012 |
| CN | 103870817 A   | * | 6/2014  |
| CN | 103870817 A   |   | 6/2014  |
| CN | 104700070 A   |   | 6/2015  |
| JP | 2005156347 A  |   | 6/2005  |

OTHER PUBLICATIONS

Morimura, Hiroki et al., "A Pixel-Level Automatic Calibration Circuit Scheme for Capacitive Fingerprint Sensor LSIs", IEE Journal of Solid-State Circuits, vol. 27, No. 10, Oct. 2002, pp. 1300-1306.
Picocap Data Sheet, "Description of Linearization Firmware", published by acam-messelectronic gmbh, Nov. 2013, 37 pages.
Supplementary Search Report issued for corresponding European patent application No. EP 15 87 7648 dated Oct. 17, 2019.
Chinese Search Report for Chinese Application No. 201710543677.3 dated Dec. 31, 2019.

* cited by examiner

FINGERPRINT SENSOR AND CORRECTION METHOD THEREOF

CROSS-REFERENCE TO RELATED APPLICATIONS

The present application is a continuation of International Application No. PCT/CN2015/094441, filed on Nov. 12, 2015, which claims priority to Chinese Patent Application No. CN 201510016150.6, filed on Jan. 13, 2015, both of which are hereby incorporated by reference herein in their entireties.

TECHNICAL FIELD

The present disclosure relates to the technical field of fingerprint recognition, and in particular, to a fingerprint sensor and a correction method thereof.

BACKGROUND

Fingerprints are texture formed by uneven skin on surfaces of fingers. The fingerprints have texture characteristics of uniqueness and stability, and therefore are often used as a basis for identity recognition. A fingerprint sensor is a sensor for recognizing an identity by means of fingerprints.

As shown in FIG. 1, a fingerprint sensor includes a fingerprint sensing chip 10 and a cover 20 that is secured to a surface of the fingerprint sensing chip 10 by means of an adhesive 30. The cover 20 is configured to protect the fingerprint sensing chip 10. A plurality of sensing units 11 (pixels) is provided on the fingerprint sensing chip 10. As shown in FIG. 2, the plurality of sensing units 11 is arranged in a matrix. The sensing unit 11 is configured to sense a fingerprint signal and output data. The fingerprint signal is information about a depth of fingerprint texture. A surface of the cover 20 is used as a sensing part of the fingerprint sensor. When the sensing part is pressed by a finger, a matrix constituted by information about depths of fingerprint texture output by all the sensing units 11 is texture information of the finger.

In an actual environment, differences exist among sensing units 11 in the same fingerprint sensor, in addition, unevenness of the adhesive 30 and impurities therein, as well as a flatness matter of the cover 20 or the like, also exist in the fingerprint sensor, and therefore responses from all the sensing units 11 are uneven. Thus, it may be improbable to obtain accurate fingerprint texture characteristics directly from data output by the fingerprint sensor. Instead, the output data needs to be corrected to eliminate such unevenness.

For this purpose, in practice, a correction operation is performed on the fingerprint sensor before delivery. A two-point correction method is used in the correction operation. In the method, on the basis of a linear relationship between output data of a sensing unit 11 and an input signal of the sensing unit 11 (that is, information about a depth of fingerprint texture), the output data of the sensing unit 11 is represented by y and the input signal of the sensing unit 11 is represented by x, coefficients k and b satisfy a linear equation y=kx+b. Therefore, a linear equation shown in FIG. 3 can be obtained by means of two points, namely, P1(x1,y1) and P2(x2,y2), on a straight line.

The specific process of the two-point correction method includes: firstly, a frame of data output by a sensing unit 11 is obtained upon a condition that the fingerprint sensor is non-loaded (that is, no object presses the sensing part of the sensor), and then, another frame of data output by the sensing unit 11 is obtained when a flat metallic block 50 is placed on the fingerprint sensor (as shown in FIG. 4). An equation group as follows is established for each sensing unit 11 separately by using the two frames of data:

$$\begin{cases} kx_1 + b = y_1 \\ kx_2 + b = y_2 \end{cases}, \quad (1)$$

where $P1(x_1,y_1)$ represents data output in the non-loaded condition and $P2(x_2,y_2)$ represents data output when the metallic block is placed, and it can be obtained that:

$$\begin{cases} k = \frac{y_2 - y_1}{x_2 - x_1} \\ b = \frac{x_2 y_1 - x_1 y_2}{x_2 - x_1} \end{cases}, \quad (2)$$

In addition, as shown in FIG. 3, $x_1$ represents a value of an input signal in the non-loaded condition, namely, 0; and $x_2$ represents a value of an input signal when the metallic block is placed, which may be defined as 1. Substitutions of $x_1$ and $x_2$ into equation (2) yield:

$$\begin{cases} k = y_2 - y_1 \\ b = y_1 \end{cases}, \quad (3)$$

After values of k and b are obtained, the output data can be corrected by using the following formula:

$$\begin{bmatrix} x_{1,1} & \cdots & x_{1,M} \\ \cdots & \cdots & \cdots \\ x_{N,1} & \cdots & x_{N,M} \end{bmatrix} = \begin{bmatrix} \frac{y_{1,1} - b_{1,1}}{k_{1,1}} & \cdots & \frac{y_{1,M} - b_{1,M}}{k_{1,M}} \\ \cdots & \cdots & \cdots \\ \frac{y_{N,1} - b_{N,1}}{k_{N,1}} & \cdots & \frac{y_{N,M} - b_{N,M}}{k_{N,M}} \end{bmatrix}$$

where N and M represent rows and columns of the sensing units 11 in the fingerprint sensor, respectively, y represents data output by the sensing units 11, and x represents data after correction (that is, the input signals of the sensing units 11).

However, the above-described correction method for a fingerprint sensor in the prior art has the following defects:

1) correction needs to be performed before delivery and the correction process increases product costs.
2) a correction environment requirement is high: a quite flat metallic block is required for correction, and it also requires no impurity such as ash exists on a sensing part of a fingerprint sensor during correction.
3) the correction is only performed for once before delivery in the prior art, while physical characteristics of a fingerprint sensor changes over time, and therefore correction coefficients (that is, the values of k and b) obtained in the previous correction becomes invalid when the physical characteristics of the fingerprint sensor change, such that the fingerprint sensor cannot be normally used and the service life of the product is shortened.

SUMMARY

The major objective of the present disclosure lies in providing a fingerprint sensor and a correction method thereof, intended to implement correction on the fingerprint sensor during a use process, to automatically modify a correction coefficient, so as to reduce the product return rate and prolong the product service life.

To achieve the objective, the present disclosure provides a fingerprint sensor, having a sensing part to be touched by a finger, including a sensing unit, a processing unit, and a correction unit, where the sensing unit is configured to sense a fingerprint signal and output first data when correction starts;

the processing unit is configured to calculate, according to a mathematical model, a new correction coefficient of the corresponding sensing unit by the first data; and the correction unit is configured to correct, according to the new correction coefficient, second data output by the corresponding sensing unit.

The present disclosure also provides a correction method for a fingerprint sensor, the fingerprint sensor including a sensing part to be touched by a finger, the sensing part including a plurality of sensing units, where the method includes the steps of:

S10: obtaining first data output by each sensing unit when correction starts;

S20: calculating, according to a mathematical model, a new correction coefficient of the corresponding sensing unit by the first data; and S30: correcting, according to the new correction coefficient, second data output by the corresponding sensing unit.

The fingerprint sensor provided in the present disclosure senses an actual fingerprint signal generated when being actually pressed by a finger and obtains data output by the sensing units, to calculate a correction coefficient during use, such that a correction operation can be performed at any time during use, and that the correction coefficient can be automatically modified when a physical characteristic of the fingerprint sensor changes, thereby reducing the product return rate and prolonging the product service life. Moreover, a step of correction before delivery is simplified or omitted for the fingerprint sensor of the embodiments of the present disclosure, thereby reducing the manufacturing difficulty and the manufacturing costs.

The objective implementations, functional features, and advantages of the present disclosure are further described in the embodiments with reference to the accompanying drawings.

DETAILED DESCRIPTION

It should be understood that the specific embodiments described herein are used only to interpret the present disclosure, but are not intended to limit the present disclosure.

Figure 1:
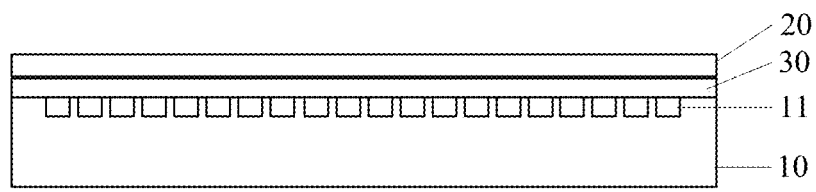
FIG. 1 is a schematic structural diagram of a fingerprint sensor.
Figure 2:
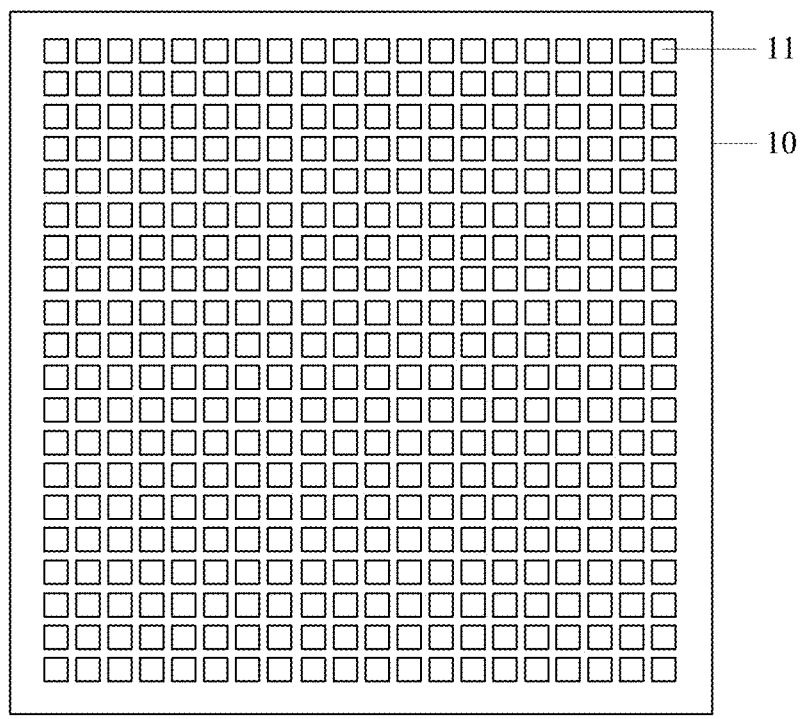
FIG. 2 is a schematic arrangement diagram of sensing units.
Figure 3:
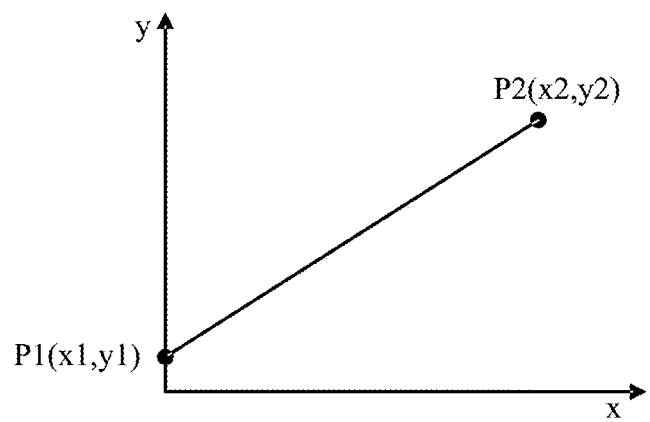
FIG. 3 is a schematic diagram of a functional relationship between data output by a sensing unit and an input signal thereof.
Figure 4:
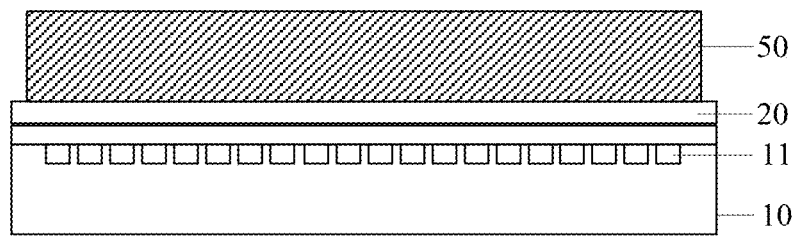
FIG. 4 is a schematic diagram of correction before delivery for a fingerprint sensor in the prior art.
Figure 5:
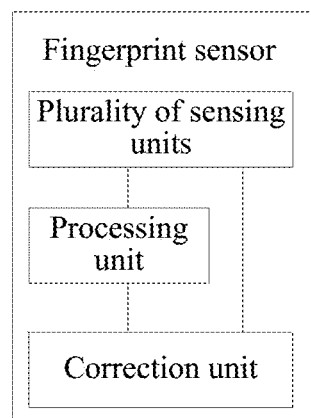
FIG. 5 is a schematic block diagram of a fingerprint sensor in the present disclosure.

Referring to FIG. 5 which illustrates a schematic block diagram of a fingerprint sensor in the present disclosure, the fingerprint sensor includes a sensing part to be pressed by a finger. The sensing part is usually covered by a cover plate as shown in FIG. 1. The sensing part includes a plurality of sensing units arranged in array, a processing unit, and a correction unit.

The sensing unit is configured to sense, when correction starts, a fingerprint signal and output first data.

The processing unit is configured to calculate, according to a mathematical model, a new correction coefficient of the corresponding sensing unit by using the first data.

Specifically, the fingerprint sensor has two modes, namely, a normal mode and a correction mode. The normal mode is used for performing normal fingerprint sensing and outputting sensing data. The correction mode is used for correcting the fingerprint sensor and obtaining correction coefficients. The new correction coefficient is obtained by using a neural network, data statistics, curve-fitting, a mathematical model, or the like; for example, a linear model of $y=kx+b$, but the present disclosure is not limited thereto. Mode switching of the fingerprint sensor may be performed by means of a mode switch unit.

The correction unit is configured to correct, according to the new correction coefficient, second data output by the corresponding sensing unit.

Figure 6:
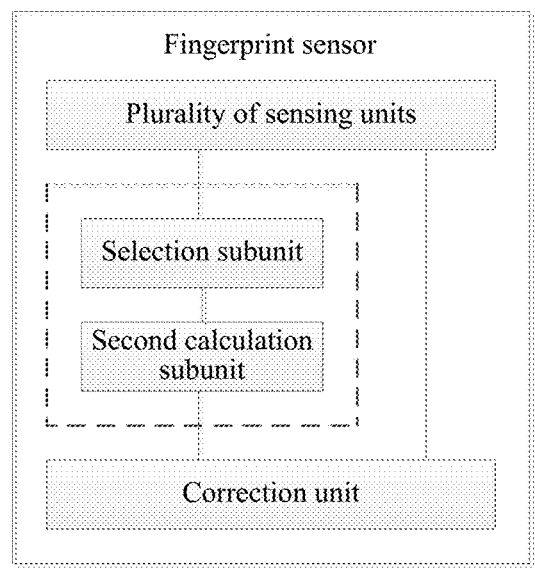
FIG. 6 is a schematic block diagram of a first embodiment of the fingerprint sensor in the present disclosure.

As shown in FIG. 6, in a first embodiment of the present disclosure, the sensing unit is configured to obtain a frame of data that is output when the fingerprint sensor is non-loaded, and is further configured to obtain at least two frames of data that are output when a finger presses different positions on the sensing part of the fingerprint sensor, and send the at least two frame of data to the processing unit.

Specifically, after the fingerprint sensor is switched to the correction mode, the sensing unit senses a fingerprint signal and obtains a frame of first data output when the fingerprint sensor is non-loaded (that is, no object presses the sensing part). The first data output by all the sensing units constitutes a frame of data. Then, a user is prompted to press different positions on the sensing part by a finger. Each time when the user presses the sensing part by the finger, a relevant frame of data output by the sensing units is obtained. In other words, the number of frames of data depends on how many times the sensing part is pressed by the finger.

Figure 7:
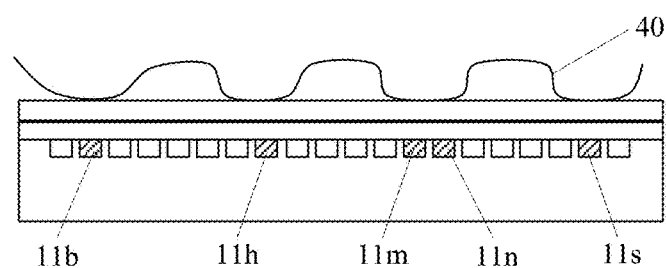
FIG. 7 is a schematic diagram of the first embodiment of the fingerprint sensor when the fingerprint sensor is pressed by a finger.

When a fingerprint ridge part (that is, a fingerprint protrusion part) presses the sensing part, more specifically, on a sensing unit, data output by the sensing unit has a maximum value. When a fingerprint valley part (that is, a fingerprint recess part) presses the sensing part, data output by a corresponding sensing unit has a smaller value. For example, when a finger presses the sensing part as shown in FIG. 7, sensing units 11$b$, 11$h$, 11$m$, 11$n$, and 11$s$ output maximum values, and the other sensing units output the smaller values.

Figure 8:
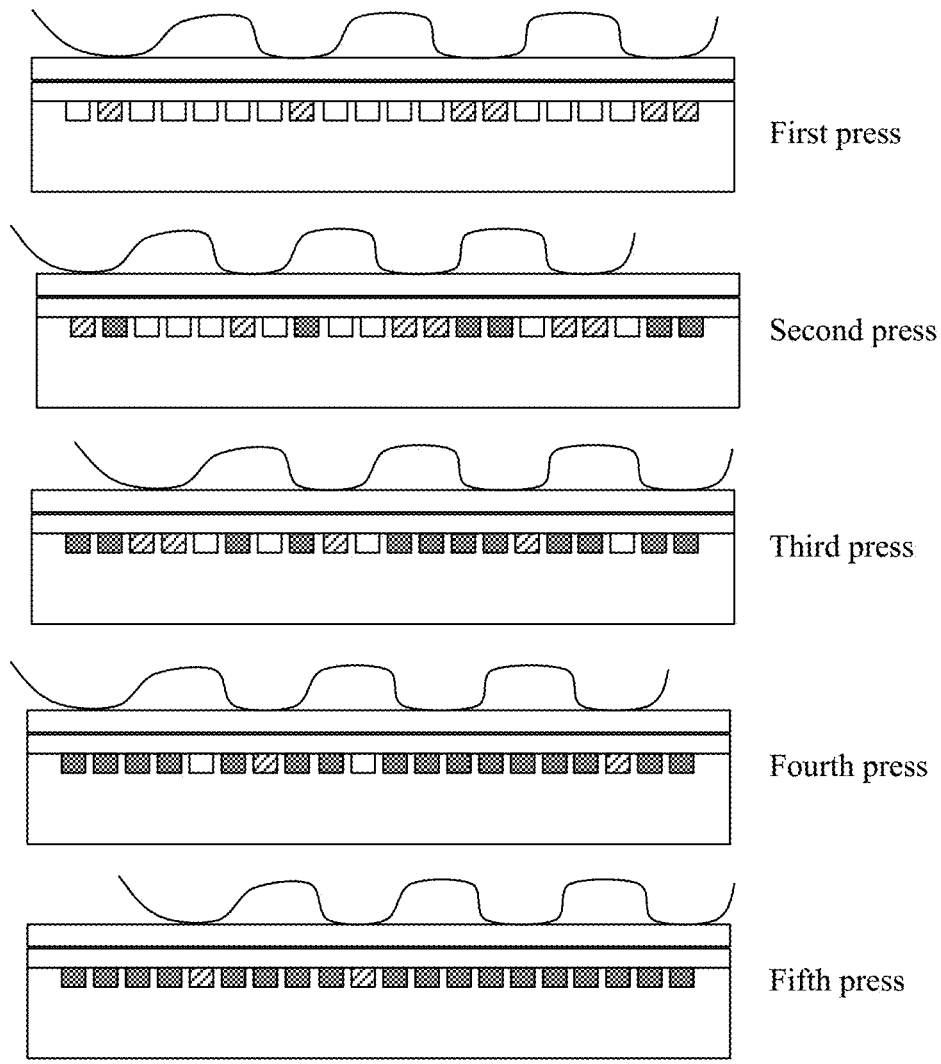
FIG. 8 is a schematic diagram of the first embodiment of the fingerprint sensor when the fingerprint sensor is pressed by a finger for a plurality of times.

The user presses the sensing part by the finger for multiple times, in such a manner that a pressing position and a pressing angle of the finger on the sensing part vary each time. Therefore, after the user presses the fingerprint sensor by the finger for a plurality of times, each sensing unit in the fingerprint sensor can be pressed by the fingerprint ridge part. The number of times for which the sensing part is pressed by the finger, that is, the number of frames obtained at load, is determined as required. Generally, the larger the sensing part is, the more frames are required, while the smaller the sensing part is, the less frames are required, on the basis that it is ensured all the sensing units are pressed by the fingerprint ridge part. For example, as shown in FIG. 8, after five times of press by the finger, each sensing unit is pressed by a fingerprint ridge part at least for one time, and the sensing units correspondingly obtain five frames of output data.

The processing unit includes a selection subunit and a second calculation subunit. The selection subunit selects a maximum value corresponding to each sensing unit from the at least two frames of data. The second calculation subunit is configured to calculate a new correction coefficient for the sensing unit.

Specifically, the selection subunit selects a maximum value corresponding to each sensing unit from at least two frames of data which are obtained at load, the maximum values of all the sensing units are equivalent to constituting a frame of data output when all the sensing units are pressed by the fingerprint ridge part. The frame of data is similar to data output by the sensing units when the sensing part is pressed by a flat metallic block during correction. Correction can be performed on the fingerprint sensor by using the frame of data and a frame of data output by the sensing units in the non-loaded condition.

In the present disclosure, data obtained by a sensing unit in the non-loaded condition is represented by Dmin, a maximum value of data obtained by the sensing unit at load is represented by Dmax, the sensing part be pressed by a finger for Num times (Num is a constant and is determined according to a specific situation), and the plurality of sensing units are arranged in N rows and M columns. $Dmax_{i,j}=MAX(D1_{i,j}, D2_{i,j}, D3_{i,j}, \ldots, Dnum_{i,j})$, where $Dnum_{i,j}$ represents the $(Num)^{th}$ frame of data output by the sensing unit at the $i^{th}$ row and the $j^{th}$ column, $i \in [1,N]$, and $j \in [1,M]$.

Then, the second calculation subunit calculates values of correction coefficients k and b based on a liner model $y=kx+b$:

$$\begin{bmatrix} k_{1,1} & \ldots & k_{1,M} \\ \ldots & \ldots & \ldots \\ k_{N,1} & \ldots & k_{N,M} \end{bmatrix} = \begin{bmatrix} Dmax_{1,1}-Dmin_{1,1} & \ldots & Dmax_{1,M}-Dmin_{1,M} \\ \ldots & \ldots & \ldots \\ Dmax_{N,1}-Dmin_{N,1} & \ldots & Dmax_{N,M}-Dmin_{N,M} \end{bmatrix}$$

$$\begin{bmatrix} b_{1,1} & \ldots & b_{1,M} \\ \ldots & \ldots & \ldots \\ b_{N,1} & \ldots & b_{N,M} \end{bmatrix} = \begin{bmatrix} Dmin_{1,1} & \ldots & Dmin_{1,M} \\ \ldots & \ldots & \ldots \\ Dmin_{N,1} & \ldots & Dmin_{N,M} \end{bmatrix}$$

If previous correction has been performed on the fingerprint sensor or primary correction before delivery has been performed, old correction coefficients are stored in a storage unit. The old correction coefficients are replaced with the correction coefficients obtained in this correction process which are used as new correction coefficients, and the new correction coefficients are stored. Alternatively, the old correction coefficients are replaced with new correction coefficients of a weighted sum of the old correction coefficients and the correction coefficients obtained in this correction process, and the new correction coefficients are stored. The correction coefficients obtained in this correction process are represented by $k_{new}$ and $b_{new}$, the old correction coefficients are represented by $k_{old}$ and $b_{old}$, the new correction coefficients are represented by k and b, and the weighted values, which can be set according to specific situation, are 0.8 and 0.2, it can be obtained that:

$$\begin{bmatrix} k_{1,1} & \ldots & k_{1,M} \\ \ldots & \ldots & \ldots \\ k_{N,1} & \ldots & k_{N,M} \end{bmatrix} = \begin{bmatrix} 0.8k_{new1,1}+0.2k_{old1,1} & \ldots & 0.8k_{new1,M}+0.2k_{old1,M} \\ \ldots & \ldots & \ldots \\ 0.8k_{newN,1}+0.2k_{oldN,1} & \ldots & 0.8k_{newN,M}+0.2k_{oldN,M} \end{bmatrix}$$

$$\begin{bmatrix} b_{1,1} & \ldots & b_{1,M} \\ \ldots & \ldots & \ldots \\ b_{N,1} & \ldots & b_{N,M} \end{bmatrix} = \begin{bmatrix} 0.8b_{new1,1}+0.2b_{old1,1} & \ldots & 0.8b_{new1,M}+0.2b_{old1,M} \\ \ldots & \ldots & \ldots \\ 0.8b_{newN,1}+0.2b_{oldN,1} & \ldots & 0.8b_{newN,M}+0.2b_{oldN,M} \end{bmatrix}$$

Compared to the method of direct replacement, the method of replacing the old correction coefficients with a calculated weighted sum of the old correction coefficients and the correction coefficients obtained in this correction process can accelerate a convergence speed of correction coefficient calculation and improve robustness of the system.

If no previous correction has been performed on the fingerprint sensor and this correction process is the first correction, the correction coefficients obtained in this correction process are used as new correction coefficients of the fingerprint sensor, and are stored.

When the fingerprint sensor is switched to the normal mode for sensing fingerprint information, the correction unit corrects, according to the following formula, data output by the sensing units:

$$\begin{bmatrix} x_{1,1} & \ldots & x_{1,M} \\ \ldots & \ldots & \ldots \\ x_{N,1} & \ldots & x_{N,M} \end{bmatrix} = \begin{bmatrix} \frac{y'_{1,1}-b_{1,1}}{k_{1,1}} & \ldots & \frac{y'_{1,M}-b_{1,M}}{k_{1,M}} \\ \ldots & \ldots & \ldots \\ \frac{y'_{N,1}-b_{N,1}}{k_{N,1}} & \ldots & \frac{y'_{N,M}-b_{N,M}}{k_{N,M}} \end{bmatrix}$$

where N and M represent rows and columns of the sensing units in the fingerprint sensor, respectively, y' represents the second data output by the sensing units, and x represents data after correction by means of the new correction coefficients.

The fingerprint sensor in the first embodiment of the present disclosure obtains at least two frames of data output by the sensing units when different positions of the sensing part are pressed by a finger, and selects maximum values from the two frames of data to constitute a frame of data output when all the sensing units are pressed by the fingerprint ridge part. The frame of data is similar to data output by the sensing units when the sensing part is pressed by a flat metallic block during correction. Correction can be performed on the fingerprint sensor by using the frame of data and a frame of data output by the sensing units in a non-loaded condition, to obtain new correction coefficients. A correction operation can be performed at any time during use for the fingerprint sensor in the embodiment of the present disclosure and the correction coefficients can be automatically modified when a physical characteristic of the fingerprint sensor changes, thereby reducing the product return rate and prolonging the product service life. Moreover, a step of correction before delivery is simplified or omitted for the fingerprint sensor in the embodiment of the present disclosure, thereby reducing the manufacturing difficulty and the manufacturing costs.

Figure 9:
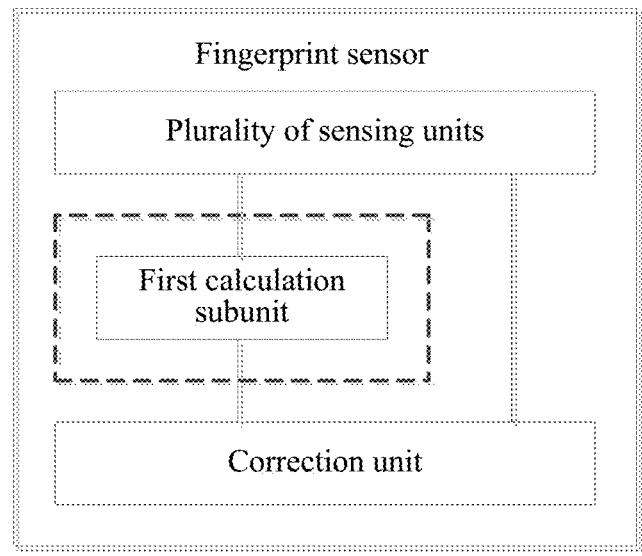
FIG. 9 is a schematic block diagram of a second embodiment of the fingerprint sensor in the present disclosure.

Referring to FIG. 9, as a second embodiment of the fingerprint sensor of the present disclosure, the processing unit includes a first calculation subunit, configured to calculate, according to a mathematical model and by means of first data output by a sensing unit and corresponding old correction coefficients, a new correction coefficient.

$$k_{new} = (1-\sigma)k_{old} + \sigma \frac{y}{F(Y)}$$

$$b_{new} = (1-\sigma)b_{old} + \sigma[y - Avg(Y)]$$

where $k_{new}$ and $b_{new}$ represent new correction coefficients of the sensing unit; $k_{old}$ and $b_{old}$ represent old correction coefficients of the sensing unit; y represents the first data output by the sensing unit; Y represents an image constituted by first data output by all the sensing units; F(Y) represents data of the corresponding sensing units after performing median filtering on Y; Avg (Y) represent data of the corresponding sensing units after calculating an average value of Y; σ represents a learning factor, where a range of σ is [0,1] and $$\sigma = \frac{|x_{old} - F(Y)|}{x_{old} + F(Y)};$$

and $x_{old}$ represents data of the sensing unit obtained after correction process by means of the old correction coefficients.

When the fingerprint sensor is switched to the normal mode for sensing fingerprint information, the correction unit corrects, according to the following formula, data output by the sensing units:

$$\begin{bmatrix} x_{1,1} & \cdots & x_{1,M} \\ \cdots & \cdots & \cdots \\ x_{N,1} & \cdots & x_{N,M} \end{bmatrix} = \begin{bmatrix} \frac{y'_{1,1} - b_{1,1}}{k_{1,1}} & \cdots & \frac{y'_{1,M} - b_{1,M}}{k_{1,M}} \\ \cdots & \cdots & \cdots \\ \frac{y'_{N,1} - b_{N,1}}{k_{N,1}} & \cdots & \frac{y'_{N,M} - b_{N,M}}{k_{N,M}} \end{bmatrix}$$

where N and M represent rows and columns of the sensing units in the fingerprint sensor, respectively, y' represent the second data output by the sensing units, and x represent data after correction process by means of the new correction coefficients.

The fingerprint sensor in the second embodiment of the present disclosure obtains a frame of first data by a finger pressing, and calculates a new correction coefficient by using the first data in combination with an old correction coefficient. A correction operation can be performed at any time during use for the fingerprint sensor in the embodiment of the present disclosure and the correction coefficients can be automatically modified when a physical characteristic of the fingerprint sensor changes, thereby reducing the product return rate and prolonging the product service life.

Figure 10:
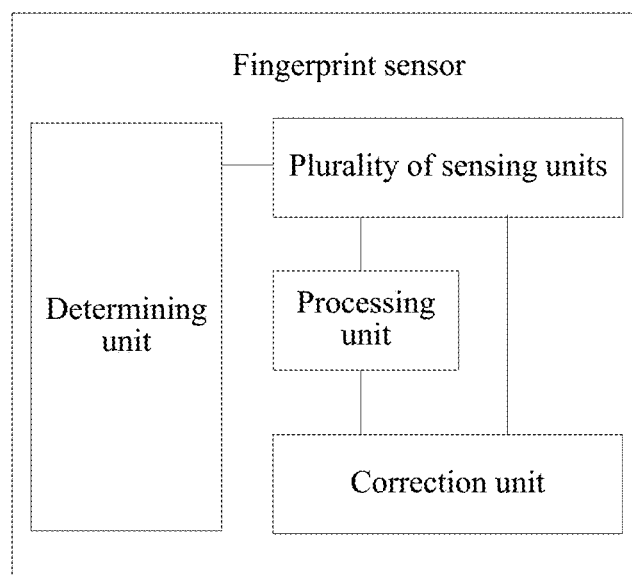
FIG. 10 is a schematic block diagram of a third embodiment of the fingerprint sensor in the present disclosure.

Referring to FIG. 10, a third embodiment of the present disclosure differs from the first embodiment and the second embodiment in that a determining unit is added. The determining unit is configured to determine whether a correction condition is satisfied, and enable a correction mode upon determining that the correction condition is satisfied, so as to start a correction operation. The correction condition includes but not limited to one of: the fingerprint sensor starts for the first time, a preset correction time is reached, a correction instruction is received, or an effect of correction by means of an old correction coefficient does not reach a designated requirement.

When detecting that the fingerprint sensor starts for the first time, the determining unit determines that the correction condition is satisfied and enables the correction mode.

Optionally, a correction time may be set. Upon detecting that the preset correction time is reached, the determining unit determines that the correction condition is satisfied and enables the correction mode. The correction time may be a specific time point, for example, the correction is set to perform once at a certain time on a certain day of a certain month; alternatively, the correction time may be a period of time, for example, the correction is set to perform once for every three months.

Optionally, an effect of correction by means of the old correction coefficient can be evaluated. If the determining unit determines that the effect does not reach the designated requirement, the correction condition is satisfied and the correction mode is enabled. The effect of correction by means of the old correction coefficient is evaluated by means of an image smoothness or a root-mean-square error of data, that is output by all the sensing units and corrected by means of the old correction coefficient.

$$\text{Root} - \text{mean} - \text{square error} = \sqrt{\frac{1}{NM} \sum_{i=1}^{N} \sum_{j=1}^{M} (x_{old(i,j)}^2 - y_{i,j}^2)}$$

$$\text{Image smoothness} = \frac{\|h_1 f\| + \|h_1^T f\|}{\|f\|}$$

where N and M represents rows and columns of the sensing units in the fingerprint sensor, respectively, y represents the data output by the sensing units, $x_{old}$ represents the data of the sensing units after being corrected by means of the old correction coefficient, f represents an image of data of all the sensing units after correction, and $h_1$=[1, −1]. If the image smoothness or the root-mean-square error is greater than a preset threshold, it is determined that the correction effect does not reach the designated requirement.

In addition, a user may also start the correction mode manually. For example, the user sends a correction instruction by means of a menu option, a functional or virtual button, a touch control instruction, a preset gesture action, or the like. If the determining unit receives the correction instruction, the determining unit determines that the correction condition is satisfied and enables the correction mode.

Optionally, the determining unit may also determine, based on a current mode, whether the correction condition is satisfied. Upon detecting that the fingerprint sensor is currently in the correction mode, the determining unit determines that the correction condition is satisfied.

It should be understood that the correction mode can also be enabled by setting other correction conditions apart from the foregoing listed examples, which is not described in detail herein.

Figure 11:
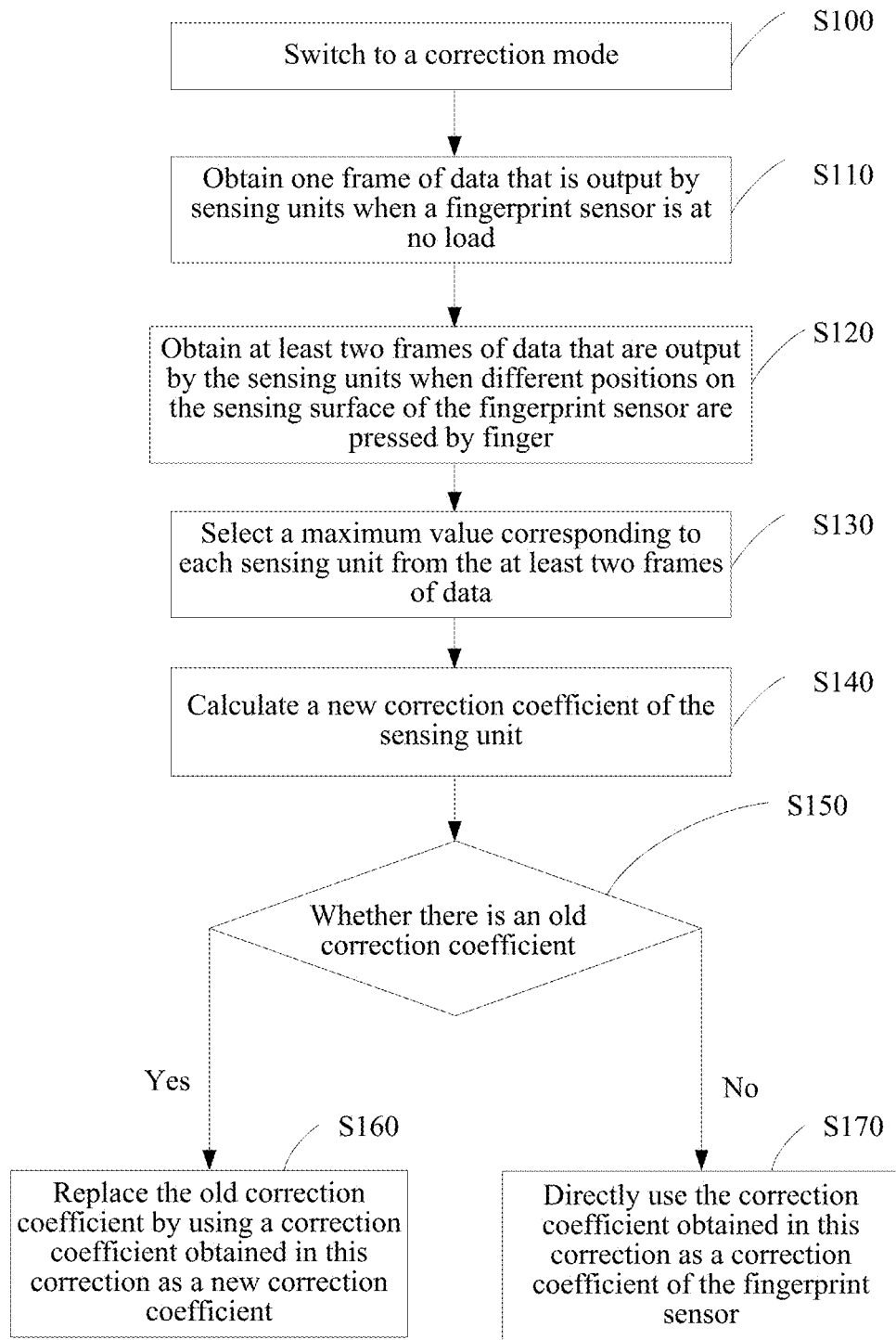
FIG. 11 is a flowchart of a first embodiment of a correction method for a fingerprint sensor in the present disclosure.

Referring to FIG. 11, a first embodiment of a correction method for a fingerprint sensor of the present disclosure is provided. The fingerprint sensor includes a sensing part to be touched by a finger. The sensing part includes a plurality of sensing units. The correction method includes the following steps:

In the S100: a correction mode is switched to.

In this embodiment, the fingerprint sensor has two modes, namely, a normal mode and a correction mode. The normal mode is used for performing normal fingerprint sensing and outputting sensing data. The correction mode is used for correcting the fingerprint sensor and obtaining correction coefficients. If the fingerprint sensor is switched to the correction mode, a correction operation starts.

In the S110: a frame of data that is output by the sensing units when the fingerprint sensor is non-loaded, is obtained.

The fingerprint sensor includes a sensing part to be pressed by a finger. The sensing part is usually covered by a cover shown in FIG. 1. The sensing part includes a plurality of sensing units arranged in array. The sensing unit is configured to sense a fingerprint signal and output data. After correction starts, the fingerprint sensor automatically obtain a frame of data that is output by the sensing units when the fingerprint sensor is non-loaded (that is, no object presses the sensing part).

In the S120: at least two frames of data that are output by the sensing units when different positions on the sensing part of the fingerprint sensor are pressed by a finger, is obtained.

The fingerprint sensor may prompt a user to press different positions on the sensing part by a finger. Each time when the user presses the sensing part by the finger, a relevant frame of data output by the sensing units is obtained. In other words, the number of frames of second data depends on how many times the sensing part is pressed by the finger In an actual use process, the user presses the sensing part by the finger in such a manner that a pressing position and a pressing angle of the finger on the sensing part vary each time. Therefore, after the user presses the fingerprint sensor by the finger for a plurality of times, each sensing unit in the fingerprint sensor can be pressed by the fingerprint ridge part. The number of times for which the sensing part is pressed by the finger, that is, the number of frames obtained data, is determined as required. Generally, the larger the sensing part is, the more frames are required, while the smaller the sensing part is, the less frames are required, on the basis that it is ensured all the sensing units are pressed by the fingerprint ridge part. For example, as shown in FIG. 8, after five times of press by the finger, each sensing unit is pressed by a fingerprint ridge part at least for one time, and correspondingly five frames of data output by the sensing units are obtained.

In the S130: a maximum value corresponding to each sensing unit is selected from the at least two frames of data.

The fingerprint sensor selects a maximum value from at least two frames of data output by each sensing unit, the maximum values of all the sensing units are equivalent to constituting a frame of data output when all the sensing units are pressed by the fingerprint ridge part. The frame of data is similar to data output by the sensing units when the sensing part is pressed by a flat metallic block during correction. Correction can be performed on the fingerprint sensor by using the frame of data and a frame of data output by the sensing units in a non-loaded condition.

Data in a non-loaded condition is represented by Dmin, a maximum value during press by a finger is represented by Dmax, the sensing part be pressed by a finger for Num times (Num is a constant and is determined according to a specific situation), and the plurality of sensing units are arranged in N rows and M columns, $Dmax_{i,j}=MAX(D1_{i,j}, D2_{i,j}, D3_{i,j}, \ldots Dnum_{i,j})$, where $Dnum_{i,j}$ represents the $(Num)^{th}$ frame of data output by the sensing unit at the $i^{th}$ row and the $j^{th}$ column, $i \in [1, N]$, and $j \in [1, M]$.

In the S140: The fingerprint sensor calculates a new correction coefficient of the sensing unit: $k_{new}$=corresponding maximum value–data output in a non-loaded condition, and $b_{new}$=data output in a non-loaded condition.

Calculation is performed by using the selected maximum value Dmax and Dmin according to the linear model y=kx+b, to obtain values of the correction coefficients k and b:

$$\begin{bmatrix} k_{1,1} & \ldots & k_{1,M} \\ \ldots & \ldots & \ldots \\ k_{N,1} & \ldots & k_{N,M} \end{bmatrix} = \begin{bmatrix} Dmax_{1,1}-Dmin_{1,1} & \ldots & Dmax_{1,M}-Dmin_{1,M} \\ \ldots & \ldots & \ldots \\ Dmax_{N,1}-Dmin_{N,1} & \ldots & Dmax_{N,M}-Dmin_{N,M} \end{bmatrix}$$

$$\begin{bmatrix} b_{1,1} & \ldots & b_{1,M} \\ \ldots & \ldots & \ldots \\ b_{N,1} & \ldots & b_{N,M} \end{bmatrix} = \begin{bmatrix} Dmin_{1,1} & \ldots & Dmin_{1,M} \\ \ldots & \ldots & \ldots \\ Dmin_{N,1} & \ldots & Dmin_{N,M} \end{bmatrix}$$

In the S150: whether there is an old correction coefficient is determined.

If a previous correction has been performed on the fingerprint sensor or primary correction before delivery has been performed, the old correction coefficient is stored and the method turns to S160. If no previous correction has been performed and this correction process is the correction for the first time, there is not an old correction coefficient and the method turns to S170.

In the S160: the old correction coefficients are replaced with the correction coefficients obtained in this correction process which are used as new correction coefficients.

If there is an old correction coefficient, the fingerprint sensor replaces the old correction coefficient by using a correction coefficient obtained in this correction process which are used as a new correction coefficient, and stores the new correction coefficients.

In some embodiments, a new correction coefficient and an old correction coefficient may also be weighted summed, and the calculation result thereof may be used as a new correction coefficient to replace the old correction coefficient and the new correction coefficient is stored. The correction coefficients obtained in this correction are represented by $k_{new}$ and $b_{new}$, old correction coefficients are represented by $k_{old}$ and $b_{old}$, new correction coefficients are represented by k and b, and the weighted values, which can be set according to specific situation, are 0.8 and 0.2, it can be obtained that:

$$\begin{bmatrix} k_{1,1} & \ldots & k_{1,M} \\ \ldots & \ldots & \ldots \\ k_{N,1} & \ldots & k_{N,M} \end{bmatrix} =$$

$$\begin{bmatrix} 0.8k_{new1,1}+0.2k_{old1,1} & \ldots & 0.8k_{new1,M}+0.2k_{old1,M} \\ \ldots & \ldots & \ldots \\ 0.8k_{newN,1}+0.2k_{oldN,1} & \ldots & 0.8k_{newN,M}+0.2k_{oldN,M} \end{bmatrix}$$

-continued $$\begin{bmatrix} b_{1,1} & \cdots & b_{1,M} \\ \cdots & \cdots & \cdots \\ b_{N,1} & \cdots & b_{N,M} \end{bmatrix} =$$

$$\begin{bmatrix} 0.8b_{new1,1} + 0.2b_{old1,1} & \cdots & 0.8b_{new1,M} + 0.2b_{old1,M} \\ \cdots & \cdots & \cdots \\ 0.8b_{newN,1} + 0.2b_{oldN,1} & \cdots & 0.8b_{newN,M} + 0.2b_{oldN,M} \end{bmatrix}$$

Compared to the method of direct replacement, the method of replacing the old correction coefficients with a calculated weighted sum of the old correction coefficients and the correction coefficients obtained in this correction process can accelerate a convergence speed of correction coefficient calculation and improve robustness of the system.

In the S170: the correction coefficient obtained in this correction process is used directly as a correction coefficient of the fingerprint sensor.

If there is not an old correction coefficient, the fingerprint sensor directly uses the correction coefficient obtained in this correction process as a correction coefficient of the fingerprint sensor and stores the correction coefficient obtained in this correction process.

Up to now, the correction is completed. When the fingerprint sensor is switched to the normal mode for sensing fingerprint information, data output by the sensing units is corrected according to the following formula:

$$\begin{bmatrix} x_{1,1} & \cdots & x_{1,M} \\ \cdots & \cdots & \cdots \\ x_{N,1} & \cdots & x_{N,M} \end{bmatrix} = \begin{bmatrix} \frac{y'_{1,1} - b_{1,1}}{k_{1,1}} & \cdots & \frac{y'_{1,M} - b_{1,M}}{k_{1,M}} \\ \cdots & \cdots & \cdots \\ \frac{y'_{N,1} - b_{N,1}}{k_{N,1}} & \cdots & \frac{y'_{N,M} - b_{N,M}}{k_{N,M}} \end{bmatrix}$$

where N and M represent rows and columns of the sensing units in the fingerprint sensor, y' represents the second data output by the sensing units, and x represents data corrected by means of the new correction coefficient.

In some embodiments, the S110 of obtaining data in the non-loaded condition may also be performed after the S130 of selecting the maximum value.

In the embodiment of the present disclosure, at least two frames of data output by the sensing units when different positions of the sensing part are pressed by a finger, are obtained, and maximum values are selected from the two frames of data, to constitute a frame of data output when all the sensing units are pressed by the fingerprint ridge part. The frame of data is similar to data output by the sensing units when the sensing part is pressed by a flat metallic block during correction. Correction can be performed on the fingerprint sensor by using the frame of data and a frame of data output by the sensing units in a non-loaded condition, to obtain new correction coefficients. A correction operation can be performed at any time during use for the fingerprint sensor in the embodiment of the present disclosure and the correction coefficients can be automatically modified when a physical characteristic of the fingerprint sensor changes, thereby reducing the product return rate and prolonging the product service life. Moreover, a step of correction before delivery is simplified or omitted for the fingerprint sensor in the embodiment of the present disclosure, thereby reducing the manufacturing difficulty and the manufacturing costs.

Figure 12:
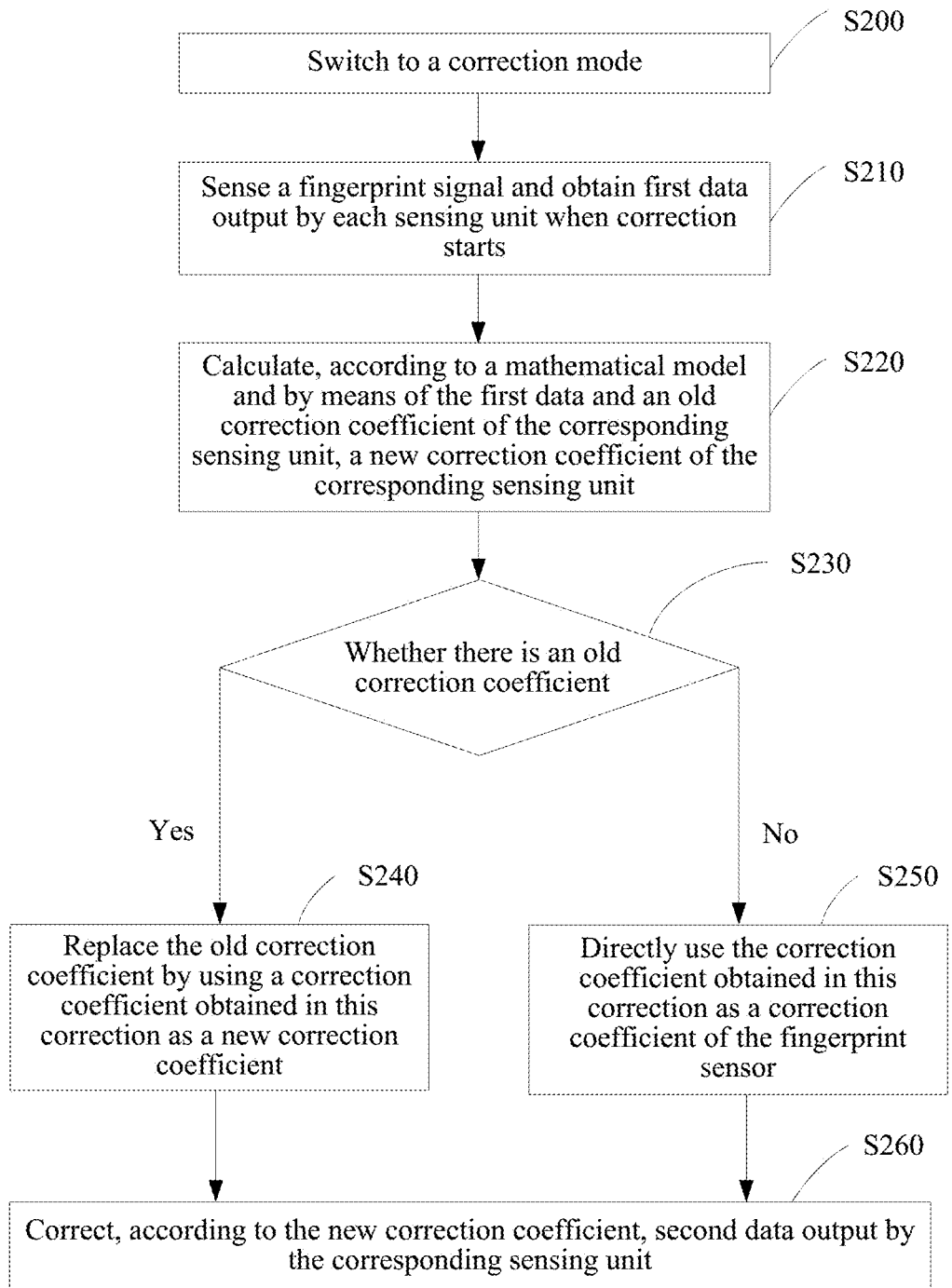
FIG. 12 is a flowchart of a second embodiment of the correction method for a fingerprint sensor in the present disclosure.

Referring to FIG. 12, a second embodiment of the correction method for a fingerprint sensor of the present disclosure is provided. The correction method includes the following steps:

In the S200: t a correction mode is switched to.

In the S210: when correction starts, a fingerprint signal is sensed and first data output by each sensing unit is obtained.

In the S220: a new correction coefficient of the corresponding sensing unit is calculated, according to a mathematical model based on the first data and an old correction coefficient of the corresponding sensing unit.

$$k_{new} = (1 - \sigma)k_{old} + \sigma \frac{y}{F(Y)}$$

$$b_{new} = (1 - \sigma)b_{old} + \sigma[y - Avg(Y)]$$

where $k_{new}$ and $b_{new}$ represent new correction coefficients of the sensing unit; $k_{old}$ and $b_{old}$ represent old correction coefficients of the sensing unit; y is the first data output by the sensing unit; Y represents an image constituted by first data output by all the sensing units; F(Y) is data of the corresponding sensing units after median filtering is performed on Y; Avg(Y) represents data of the corresponding sensing units after an average of Y is calculated; σ represents a learning factor, where a range of σ is [0,1] and $$\sigma = \frac{|x_{old} - F(Y)|}{x_{old} + F(Y)};$$

and $x_{old}$ represents data of the sensing unit obtained after correction by means of the old correction coefficient.

In the S230: whether there is an old correction coefficient is determined.

If a previous correction has been performed on the fingerprint sensor or primary correction before delivery has been performed, an old correction coefficient is stored and the method turns to S240. If no previous correction has been performed and this correction is the correction for the first time, there is not an old correction coefficient and the method turns to S250.

In the S240: the old correction coefficients are replaced with the correction coefficients obtained in this correction process which are used as new correction coefficients.

If there is an old correction coefficient, the fingerprint sensor replaces the old correction coefficient with a correction coefficient obtained in this correction process which is used as a new correction coefficient, and stores the new correction coefficient.

In some embodiments, a new correction coefficient and an old correction coefficient may also be weighted summed, and the calculation result thereof may be used as a new correction coefficient to replace the old correction coefficient and the new correction coefficient is stored. The correction coefficients obtained in this correction are represented by $k_{new}$ and $b_{new}$, old correction coefficients are represented by $k_{old}$ and $b_{old}$, new correction coefficients are represented by k and b, and weighted values, which can be set according to specific situation, are 0.8 and 0.2, it can be obtained that:

$$\begin{bmatrix} k_{1,1} & \cdots & k_{1,M} \\ \cdots & \cdots & \cdots \\ k_{N,1} & \cdots & k_{N,M} \end{bmatrix} =$$

$$\begin{bmatrix} 0.8k_{new1,1}+0.2k_{old1,1} & \cdots & 0.8k_{new1,M}+0.2k_{old1,M} \\ \cdots & \cdots & \cdots \\ 0.8k_{newN,1}+0.2k_{oldN,1} & \cdots & 0.8k_{newN,M}+0.2k_{oldN,M} \end{bmatrix}$$

$$\begin{bmatrix} b_{1,1} & \cdots & b_{1,M} \\ \cdots & \cdots & \cdots \\ b_{N,1} & \cdots & b_{N,M} \end{bmatrix} =$$

$$\begin{bmatrix} 0.8b_{new1,1}+0.2b_{old1,1} & \cdots & 0.8b_{new1,M}+0.2b_{old1,M} \\ \cdots & \cdots & \cdots \\ 0.8b_{newN,1}+0.2b_{oldN,1} & \cdots & 0.8b_{newN,M}+0.2b_{oldN,M} \end{bmatrix}$$

Compared to the method of direct replacement, the method of replacing the old correction coefficients with a calculated weighted sum of the old correction coefficients and the correction coefficients obtained in this correction process can accelerate a convergence speed of correction coefficient calculation and improve robustness of the system.

In the S250: the correction coefficient obtained in this correction process is used directly as a correction coefficient of the fingerprint sensor.

In the 260: according second data output by the corresponding sensing unit is corrected according to the new correction coefficient.

When the fingerprint sensor is switched to the normal mode for sensing fingerprint information, data output by the sensing units is corrected according to the following formula:

$$\begin{bmatrix} x_{1,1} & \cdots & x_{1,M} \\ \cdots & \cdots & \cdots \\ x_{N,1} & \cdots & x_{N,M} \end{bmatrix} = \begin{bmatrix} \frac{y'_{1,1}-b_{1,1}}{k_{1,1}} & \cdots & \frac{y'_{1,M}-b_{1,M}}{k_{1,M}} \\ \cdots & \cdots & \cdots \\ \frac{y'_{N,1}-b_{N,1}}{k_{N,1}} & \cdots & \frac{y'_{N,M}-b_{N,M}}{k_{N,M}} \end{bmatrix}$$

where N and M represent rows and columns of the sensing units in the fingerprint sensor, y' represents the second data output by the sensing units, and x represents data corrected by means of the new correction coefficient.

S230, S240, and S250 correspond to and are the same as S150, S160, and S170, respectively, which will not be described in detail again herein.

In this embodiment, a new correction coefficient is calculated by using a frame of first data obtained through one press by a finger in combination with an old correction coefficient. A correction operation can be performed by the fingerprint sensor at any time during use in the embodiment of the present disclosure and the correction coefficient can be automatically modified when a physical characteristic of the fingerprint sensor changes, thereby reducing the product return rate and prolonging the product service life.

Figure 13:
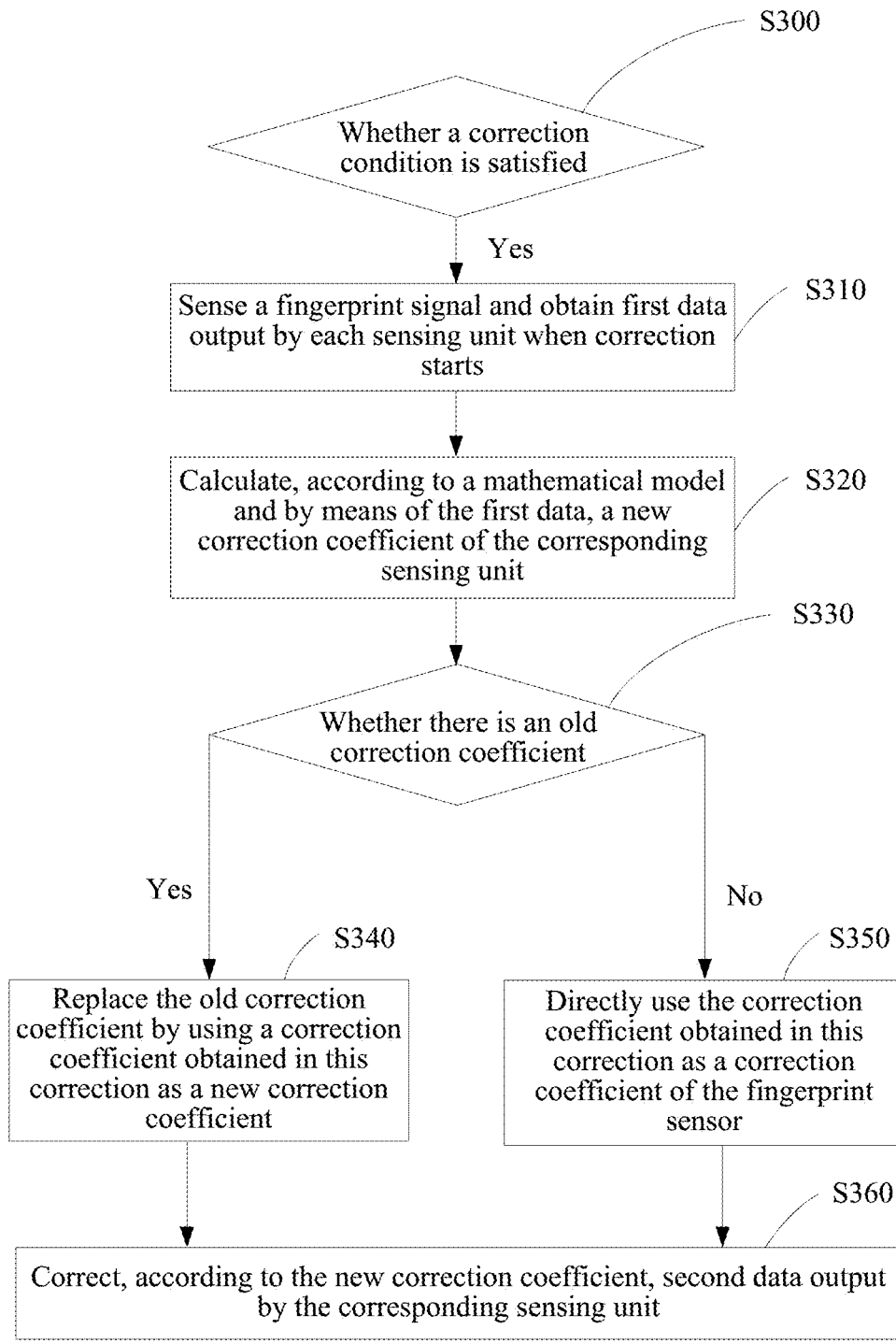
FIG. 13 is a flowchart of a third embodiment of the correction method for a fingerprint sensor in the present disclosure.

Referring to FIG. 13, a third embodiment of the correction method for a fingerprint sensor of the present disclosure is provided. The correction method includes the following steps:

In the S300: whether a correction condition is satisfied is determined.

In this embodiment, a correction mode is enabled by setting a correction condition. When it is detected that the fingerprint sensor is enabled for the first time, a preset correction time is reached, a correction instruction is received, or an effect of correction by means of an old correction coefficient does not reach a designated requirement, it is determined that the correction condition is satisfied, the correction mode is enabled, the method turns to S310, and a correction operation starts. When it is determined that the correction condition is not satisfied, the determination are continuously performed.

The fingerprint sensor may be set to be in a correction mode-enabled state by default when it is enabled for the first time. Optionally, a correction time may be set. The correction time may be a specific time point, for example, the correction is set to be performed once at a certain time on a certain day of a certain month, or may be set to be performed at a time interval, for example, the correction may set to be performed once for every three days. Furthermore, the user sends a correction instruction by means of a menu option, a functional or virtual button, a touch control instruction, a preset gesture action, or the like, to manually enable the correction mode.

Optionally, an effect of correction by means of the old correction coefficient can be evaluated. If the determining unit determines that the effect does not reach the designated requirement, the correction condition is satisfied and the correction mode is enabled. The effect of correction by means of the old correction coefficient is evaluated by means of an image smoothness or a root-mean-square error of data that is output by all the sensing units and corrected by means of the old correction coefficient.

$$\text{Root-mean-square error} = \sqrt{\frac{1}{NM}\sum_{i=1}^{N}\sum_{j=1}^{M}(x_{old(i,j)}^2 - y_{i,j}^2)}$$

$$\text{Image smoothness} = \frac{\|h_1 f\| + \|h_1^T f\|}{\|f\|}$$

where N and M represent rows and columns of the sensing units in the fingerprint sensor, respectively, y represents the data output by the sensing units, $x_{old}$ represents the data of the sensing units after being corrected by means of the old correction coefficient, f represents an image of data of all the sensing units after correction, and $h_1=[1, -1]$. If the image smoothness or the root-mean-square error is greater than a preset threshold, it is determined that the correction effect does not reach the designated requirement.

It should be understood that the correction function can also be enabled by setting other correction conditions apart from the foregoing listed examples, which is not described in detail herein.

Optionally, the fingerprint sensor may also determine, by determining a current mode, whether the correction condition is satisfied. For example, if it is detected that the fingerprint sensor is currently in the correction mode, the fingerprint sensor determines that the correction condition is satisfied.

In the S310: when correction starts, a fingerprint signal is sensed and first data output by each sensing unit is obtained.

In the S320: a new correction coefficient of the corresponding sensing unit is calculated by the first data according to a mathematical model.

In the S330: whether there is an old correction coefficient is determined.

If there is an old correction coefficient, S340 is processed; and otherwise, S350 is processed.

In the S340, the old correction coefficients are replaced with the correction coefficients obtained in this correction process which are used as new correction coefficients.

If there is an old correction coefficient, the fingerprint sensor replaces the old correction coefficient with a correction coefficient obtained in this correction process which is used as a new correction coefficient, and stores the new correction coefficient.

In some embodiments, a new correction coefficient and an old correction coefficient may also be weighted summed, and the calculation result thereof may be used as a new correction coefficient to replace the old correction coefficient and the new correction coefficient is stored. The correction coefficients obtained in this correction are represented by $k_{new}$ and $b_{new}$, old correction coefficients are represented by $k_{old}$ and $b_{old}$ new correction coefficients are represented by k and b, and the weighted values, which can be set according to specific situation, are 0.8 and 0.2, it can be obtained that:

$$\begin{bmatrix} k_{1,1} & \cdots & k_{1,M} \\ \cdots & \cdots & \cdots \\ k_{N,1} & \cdots & k_{N,M} \end{bmatrix} =$$

$$\begin{bmatrix} 0.8k_{new1,1} + 0.2k_{old1,1} & \cdots & 0.8k_{new1,M} + 0.2k_{old1,M} \\ \cdots & \cdots & \cdots \\ 0.8k_{newN,1} + 0.2k_{oldN,1} & \cdots & 0.8k_{newN,M} + 0.2k_{oldN,M} \end{bmatrix}$$

$$\begin{bmatrix} b_{1,1} & \cdots & b_{1,M} \\ \cdots & \cdots & \cdots \\ b_{N,1} & \cdots & b_{N,M} \end{bmatrix} =$$

$$\begin{bmatrix} 0.8b_{new1,1} + 0.2b_{old1,1} & \cdots & 0.8b_{new1,M} + 0.2b_{old1,M} \\ \cdots & \cdots & \cdots \\ 0.8b_{newN,1} + 0.2b_{oldN,1} & \cdots & 0.8b_{newN,M} + 0.2b_{oldN,M} \end{bmatrix}$$

Compared to the method of direct replacement, the method of replacing the old correction coefficients with a calculated weighted sum of the old correction coefficients and the correction coefficients obtained in this correction process can accelerate a convergence speed of correction coefficient calculation and improve robustness of the system.

In the S350: the correction coefficient obtained in this correction process is used directly as a correction coefficient of the fingerprint sensor.

In the S360: according to the new correction coefficient, second data output by the corresponding sensing unit is corrected according to the new correction coefficient.

It should be noted that: the present disclosure is described by examples based on division of all the foregoing functional modules when the fingerprint sensor provided in the embodiment performs correction, and in actual application, the functions can be allocated to be implemented by different functional modules according to needs. In addition, the fingerprint sensor provided in the embodiments and the correction method embodiments for a fingerprint sensor belong to the same inventive concept, and the technical features in the method embodiments are accordingly applicable in the embodiments of the fingerprint sensor.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM/RAM, a magnetic disk, an optical disc, or the like.

The foregoing descriptions are merely preferred embodiments of the present disclosure but are not intended to limit the patent scope of the present disclosure. A person skilled in the art may implement the present disclosure by using various variant solutions without departing from the scope and essence of the present disclosure, for example, further another embodiment is obtained if a feature of one embodiment is applied to another embodiment. Any alteration, equivalent change or modification made within the technical concept of the present disclosure shall fall within the scope of the claims of the present disclosure.

What is claimed is:

1. A fingerprint sensor, comprising a sensing part to be touched by a finger, the sensing part comprising a plurality of sensing units, wherein the fingerprint sensor further comprises a processing unit and a correction unit, wherein:

the sensing unit is configured to sense, when correction starts, a fingerprint signal and output first data;

the processing unit is configured to calculate, according to a mathematical model, a new correction coefficient of the corresponding sensing unit by using the first data; and the correction unit is configured to correct, according to the new correction coefficient, second data output by the corresponding sensing unit;

wherein the processing unit comprises a first calculation subunit, configured to calculate, according to the mathematical model, a new correction coefficient of the corresponding sensing unit by using the first data and the old correction coefficient of the corresponding sensing unit, $$k_{new} = (1-\sigma)k_{old} + \sigma\frac{y}{F(Y)}$$

$$b_{new} = (1-\sigma)b_{old} + \sigma[y - Avg(Y)]$$

wherein $k_{new}$ and $b_{new}$ represent new correction coefficients of the sensing unit; $k_{old}$ and $b_{old}$ represent old correction coefficients of the sensing unit; y represent the first data output by the sensing unit; Y represents an image constituted by first data output by all the sensing units; F(Y) represents data of the corresponding sensing units after performing median filtering on Y; Avg (Y) represents data of the corresponding sensing units after calculating an average of Y; σ represents a learning factor, wherein a range of σ is [0,1] and $$\sigma = \frac{|x_{old} - F(Y)|}{x_{old} + F(Y)};$$

and $x_{old}$ represents data of the sensing unit obtained after correction process by means of the old correction coefficients.

2. The fingerprint sensor according to claim 1, further comprising a storage unit, configured to store a correction coefficient, wherein if an old correction coefficient is stored in the fingerprint sensor, the old correction coefficient is replaced with the new correction coefficient, or the old correction coefficient is replaced with a weighted sum of the new correction coefficient and the old correction coefficient.

3. The fingerprint sensor according to claim 2, further comprising a determining unit, configured to determine whether a correction condition is satisfied, wherein the correction condition comprises one or more of the following: the fingerprint sensor is enabled for the first time, a preset correction time is reached, a correction instruction is received, or an effect of correction by means of the old correction coefficient does not reach a designated requirement.

4. The fingerprint sensor according to claim 3, wherein the effect of correction by means of the old correction coefficient is evaluated by using an image smoothness or a root-mean-square error of data that is output by all the sensing units and corrected by means of the old correction coefficient, and if the an image smoothness or the root-mean-square error is greater than a preset threshold, the designated requirement is not reached.

5. The fingerprint sensor according to claim 1, wherein the correction unit is specifically configured to:
calculate $$x_{new} = \frac{y' - b_{new}}{k_{new}},$$

wherein $k_{new}$ and $b_{new}$ represent new correction coefficients of the sensing unit, y' represents the second data output by the sensing unit, and $x_{new}$ represents data of the sensing unit after correction by means of the new correction coefficients.

6. A correction method for a fingerprint sensor, the fingerprint sensor comprising a sensing part to be touched by a finger, the sensing part comprising a plurality of sensing units, wherein the method comprises steps of:
S10: when correction starts, sensing a fingerprint signal and obtaining first data output by each sensing unit;
S20: calculating, according to a mathematical model, a new correction coefficient of the corresponding sensing unit by using the first data; and
S30: correcting, according to the new correction coefficient, second data output by the corresponding sensing unit;
wherein step S20 specifically comprises: calculating, according to the mathematical model, a new correction coefficient of the corresponding sensing unit by using the first data and the old correction coefficient of the corresponding sensing unit, $$k_{new} = (1 - \sigma)k_{old} + \sigma \frac{y}{F(Y)}$$
$$b_{new} = (1 - \sigma)b_{old} + \sigma[y - Avg(Y)]$$

wherein $k_{new}$ and $b_{new}$ represent new correction coefficients of the sensing unit; $k_{old}$ and $b_{old}$ represent old correction coefficients of the sensing unit; y represents the first data output by the sensing unit; Y represents an image constituted by first data output by all the sensing units; F(Y) represents data of the corresponding sensing units after performing median filtering on Y; Avg(Y) represents data of the corresponding sensing units after calculating an average of Y; σ represents a learning factor, wherein a range of σ is [0,1] and $$\sigma = \frac{|x_{old} - F(Y)|}{x_{old} + F(Y)};$$

and $x_{old}$ represents data of the sensing unit obtained after correction process by means of the old correction coefficients.

7. The correction method according to claim 6, wherein after step S20 but before step S30, the method further comprises:
if an old correction coefficient is stored in the fingerprint sensor, replacing the old correction coefficient with the new correction coefficient, or with a weighted sum of the new correction coefficient and the old correction coefficient.

8. The correction method according to claim 7, wherein before step S10, the method further comprises:
determining whether a correction condition is satisfied, and executing S10 if the correction condition is satisfied, wherein the correction condition comprises: the fingerprint sensor is enabled for the first time, a preset correction time is reached, a correction instruction is received, or an effect of correction by means of the old correction coefficient does not reach a designated requirement.

9. The correction method according to claim 8, wherein the effect of correction by means of the old correction coefficient is evaluated by using an image smoothness or a root-mean-square error of data that is output by all the sensing units and corrected by means of the old correction coefficient, and if the an image smoothness or the root-mean-square error is greater than a preset threshold, the designated requirement is not reached.

10. The correction method according to claim 6, wherein step S30 specifically comprises:
correcting the second data according to a formula $$x_{new} = \frac{y' - b_{new}}{k_{new}},$$

wherein $k_{new}$ and $b_{new}$ represent new correction coefficients of the sensing unit, y' represent the second data output by the sensing unit, and $x_{new}$ represents data of the sensing unit after correction by means of the new correction coefficients.

* * * * *